(12) United States Patent
Ott (10) Patent No.: US 6,873,248 B2
(45) Date of Patent: Mar. 29, 2005

(54) IDENTIFICATION SYSTEM FOR CONFIRMING AUTHORIZATION FOR ACCESS TO AN OBJECT OR THE USE OF AN OBJECT, IN PARTICULAR OF A MOTOR VEHICLE

(75) Inventor: Albert Ott, Wiesbaden-Auringen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/270,955

(22) Filed: Oct. 15, 2002

(65) Prior Publication Data

US 2003/0052539 A1 Mar. 20, 2003

Related U.S. Application Data (63) Continuation of application No. PCT/EP02/01080, filed on Jan. 28, 2002.

(30) Foreign Application Priority Data

Feb. 15, 2001 (EP) .............................................. 01103764

(51) Int. Cl.$^7$ .......................... G05B 19/00; G06F 7/00; G08B 29/00; H04B 1/00; B60R 25/00
(52) U.S. Cl. ..................................... 340/5.72; 340/5.61
(58) Field of Search ............................... 340/5.61, 5.33, 340/5.5, 5.64, 10.1–10.6, 572.1, 572.7, 7.2; 341/176; 455/171.1–181.1; 375/141, 332

(56) References Cited

U.S. PATENT DOCUMENTS

| | | | |
|---|---|---|---|
| 4,250,533 A | 2/1981 | Nelson ........................ 361/172 |
| 5,552,641 A | * 9/1996 | Fischer et al. .............. 307/10.5 |
| 5,723,911 A | * 3/1998 | Glehr ......................... 340/10.5 |
| 5,790,043 A | * 8/1998 | Hettich et al. .............. 340/5.62 |
| 5,983,347 A | * 11/1999 | Brinkmeyer et al. ........ 340/5.62 |
| 6,100,603 A | * 8/2000 | Gold .......................... 307/10.2 |
| 6,208,239 B1 | * 3/2001 | Muller et al. ........... 340/426.35 |
| 6,246,729 B1 | * 6/2001 | Richardson ................. 375/324 |
| 6,323,566 B1 | * 11/2001 | Meier ......................... 307/10.2 |
| 6,332,572 B1 | * 12/2001 | Yamamoto et al. ......... 235/382 |
| 6,363,100 B1 | * 3/2002 | Ohki et al. ................. 375/141 |
| 6,433,671 B1 | * 8/2002 | Nysen ...................... 340/10.41 |
| 6,476,712 B1 | * 11/2002 | Achterholt .................. 340/447 |

FOREIGN PATENT DOCUMENTS

| | | | | |
|---|---|---|---|---|
| DE | 19823596 A1 | 12/1999 | ............. H04L/9/32 |
| DE | 19923983 A1 | 12/2000 | ............. G07C/9/00 |
| EP | 0955217 A2 | 11/1999 | ............ B60R/25/00 |

* cited by examiner

*Primary Examiner*—Michael Horabik
*Assistant Examiner*—Nam Nguyen
(74) *Attorney, Agent, or Firm*—Baker Botts L.L.P.

(57) ABSTRACT

An identification system in which a trigger signal, emitted on an object side and received by a portable code generator, is provided. The trigger signal is used on the object side to phase code a reference signal. The code generator encodes a response signal using the trigger signal in a phase-coded manner and retransmits the response signal. The received response signal is compared with the generated reference signal in an object-side evaluation unit using an autocorrelation function. If the value of the autocorrelation function is larger than a threshold value, an enabling signal is generated.

19 Claims, 6 Drawing Sheets

IDENTIFICATION SYSTEM FOR CONFIRMING AUTHORIZATION FOR ACCESS TO AN OBJECT OR THE USE OF AN OBJECT, IN PARTICULAR OF A MOTOR VEHICLE

CROSS REFERENCE TO RELATED APPLICATION

This application is a continuation of co-pending International Application No. PCT/EP02/01080 filed Jan. 28, 2002 which designates the United States, and claims priority to European application number 01103764.5 filed Feb. 15, 2001.

BACKGROUND OF THE INVENTION

The invention relates to an identification system for confirming authorization for access to an object or the use of an object, in particular of a motor vehicle.

Radio-based identification systems, also referred to as RF-ID "radio frequency identification" systems, are being increasingly used, for example as a replacement for mechanical key systems, in access protection for computers or for example in automatic payment systems. An RF ID system is composed of an identification mark (referred to as code transmitter) which is also referred to as an electronic key, RF-ID tag, ID transmitter or ID card which the user carries on his person or which is arranged on an object to be identified. The code transmitter is equipped with a characteristic code (code information). This code is interrogated via a base station (referred to below as a transceiver unit) and subsequently authenticated or verified.

Various radio-based transmission technologies are possible or customary: LF systems in the frequency range of 100–300 kHz, RF systems of 433 MHz or 867 MHz and high-frequency microwave systems which usually operate at the frequencies 2.4 GHz, 5.8 GHz, 9.5 GHz or 24 GHz.

In code transmitters the distinction is made between active and passive identification. Passive identification is characterized in that the code transmitter can be interrogated continuously by the transceiver unit without the intervention of the user.

If the code transmitter is located within a certain distance range from the transceiver unit, the communication between the transceiver unit and code transmitter takes place automatically or, for example in the case of manual activation of a switching device, takes place, for example, by the activation of a door latch by the user. The restriction of the distance range results generally from the radio field attenuation.

On the other hand, in the case of an active identification system, the communication is triggered actively on the code transmitter by the user. In this context, the user must therefore usually firstly operate the code transmitter manually and then, for example, additionally activate the door latch. Therefore, for reasons of increased convenience, passive identification systems are being used to a greater extent.

A customary and favorable embodiment of code transmitters are what are referred to as backscatter code transmitters (DE 198 39 696 C2). Here, a transceiver unit emits a transmission signal (referred to below as interrogation signal) with a linear frequency-modulated carrier wave in the direction of the code transmitter. If the code transmitter receives the interrogation signal, it is reflected back in a modulated fashion but not further evaluated there internally.

At the base station, the interrogation signal and response signal are evaluated, on the one hand, in terms of correspondence of the received code information with an anticipated code information item and, on the other hand, in terms of a frequency offset (frequency difference) between the transmission frequency and reception frequency. The chronological frequency offset corresponds to a radio link travelled along (signal transit time). If the frequency difference lies within a predefined interval, the code transmitter is regarded as authorized (if the code has then also been recognized as authorized), and the desired function is triggered in the object.

A disadvantage with such identification systems is that the transmission channel can be monitored unnoticed and at, in principle, any desired time. By using a suitable device it is therefore normally possible for an attacker to access the code without authorization, and thus overcome the protective function which is actually aimed at.

In the known identification systems, an unauthorized person can place a "mirror" in the vicinity of the object and use it to reflect the interrogation signal. Since an authorized code transmitter is recognized on the basis of a slight frequency difference, and a code transmitter in the vicinity of the object is simulated, the protective function is simply overcome.

SUMMARY OF THE INVENTION

The object of the invention is to provide an identification system which has improved security against unauthorized user or unauthorized access.

This object is achieved according to the invention by means of an identification system for confirming authorization for access to an object or the use of an object comprising:

a transceiver unit which is arranged at the object and which generates and emits a trigger signal, wherein a phase-encoded reference signal is generated using the trigger signal and a defined code, a mobile code transmitter which receives the trigger signal and generates a phase-encoded response signal using the received trigger signal and a code which corresponds to the code of the transceiver unit, and transmits the response signal back, and an object-end evaluation unit which has a correlation unit which calculates a correlation value of a correlation function using the received response signal and the reference signal and which generates an enable signal for controlling a security assembly only if the correlation value is greater than a predefined threshold value.

A method for confirming authorization for access to an object or the use of an object may comprise the steps of:

generating and emitting a trigger signal at the object;

generating a phase-encoded reference signal using the trigger signal and a defined code at the object, receiving the trigger signal at a mobile code transmitter;

generating a phase-encoded response signal using the received trigger signal and a code which corresponds to the code of the transceiver unit;

transmitting the response signal back to the object;

calculating a correlation value of a correlation function using the received response signal and the reference signal; and generating an enable signal for controlling a security assembly only if the correlation value is greater than a predefined threshold value.

The object may be preferably a motor vehicle.

A trigger signal is generated by a transceiver unit which is arranged at the object end, and is emitted at one end and used to generate an encoded reference signal at the other end. If a mobile code transmitter receives the trigger signal, it itself generates an encoded response signal which is transmitted back to the object. At the object-end transceiver unit, the reference signal and response signal are then correlated with one another and an enable signal for enabling a security assembly is generated as a function of the degree of correspondence.

The reference signal and response signal are phase-modulated here. This has the advantage that, in addition to the encoding, the distance of the code transmitter from the object must also correspond to a predefined value even if the encoding itself has been recognized as authorized. This ensures that only users with an authorized code transmitter and in the vicinity of the object can also actually access the object and also use it.

Advantageous refinements of the invention are given in the dependent claims.

BRIEF DESCRIPTION OF THE DRAWINGS

Exemplary embodiments of the invention are explained in more detail below with reference to the schematic drawings, in which:

FIGS. 5A to 6C show pulse diagrams of transmitted and received signals in the identification system and calculated correlation signals of an implemented identification system.

DETAILED DESCRIPTION OF THE PREFERRED EMBODIMENTS

An identification system for confirming authorization for access to an object or the use of an object by means of the example of a motor vehicle 1 (FIG. 1) as an object is explained in more detail below. The identification system can, of course, also be used with other objects in which access is possible only after confirmation of authorization, for example with a computer, a telephone, an ATM, a building, garage or other regions which are initially barred.

Figure 1:
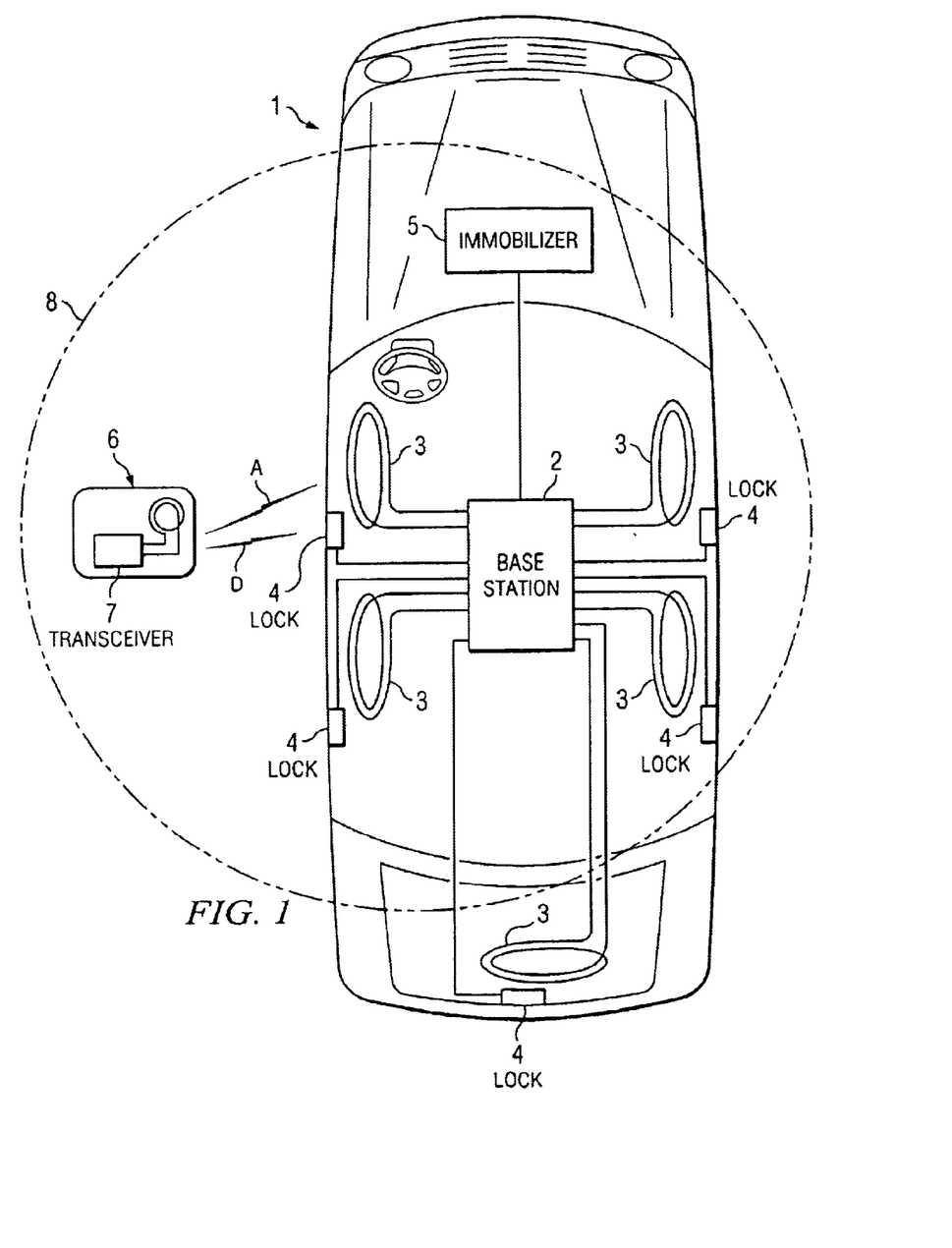
FIG. 1 shows an identification system according to the invention which is arranged in a motor vehicle.

The identification system for a motor vehicle has a base station 2 with a transceiver unit (not explicitly illustrated) which is arranged at a central point in the motor vehicle 1. The base station 2 is connected to transmission and reception antennas 3 via which signals are transmitted and received. Security assemblies (such as door locks 4 for access to the motor vehicle 1 or the immobilizer 5 (for example in the engine controller) for the use of the motor vehicle 1) are arranged in the motor vehicle 1, said security assemblies being controlled so as to go into a locked or unlocked state using an enable signal only when authorization is confirmed.

Furthermore, the identification system has a mobile, code transmitter 6 which itself has a transceiver unit 7. The code transmitter 6 can receive and emit signals. It is usually used to emit an encoded response signal with which authorization for access or use of the object is confirmed.

In the present identification system, authorization is confirmed only if the base station 2 receives the correctly encoded response signal and it becomes apparent that the code transmitter 6 is arranged within a range 8 (represented in FIG. 1 by means of the dot-dash circle by way of illustration) around the transmitting and/or receiving object-end antenna 3. The identification system according to the invention uses here as it were a distance measurement and a code comparison in a single process in order to confirm authorization for the access or the use.

The dependence on the distance 1 (thus on the signal transit time $\tau$ of the signals given the known speed of light c) and on the code brought about according to the invention by means of phase encoding of the signals and evaluation using the autocorrelation function AKF or the cross-correlation function KKF.

Figure 2A:
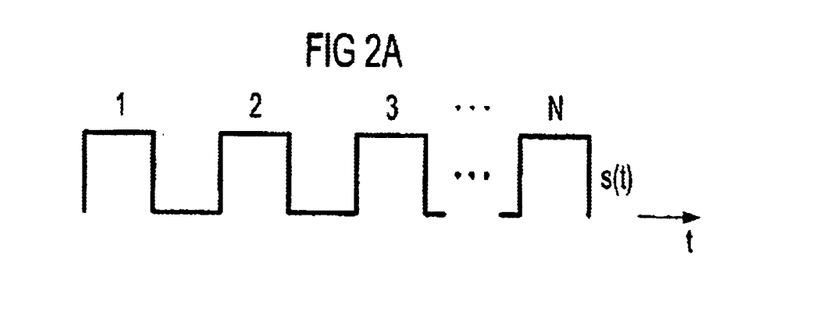
FIGS. 2A and 2B show a transmission signal and a reception signal of the identification system.

FIG. 2A illustrates a pulse-shaped transmission signal s(t) (also referred to as code pulse) which is emitted, for example, by the base station 2. After a signal transmit time $\tau$, the same signal is received again by the base station 2 (reception signal s(t–$\tau$)). This would correspond to the case in which the transmission signal s(t) is emitted by the motor vehicle 1, and the transmission signal is "reflected" by the code transmitter 6 and transmitted back to the base station 2.

The signal transit time r corresponds here to the transit time in the free space from the transmission antenna 3 in the vehicle to the code transmitter 6 and back to the reception antenna 3. In addition, the signal transit time $\tau$ may also contain an electronic transit time which is caused by electronic processing and the time required for it by the electronic modules used.

Figure 2B:
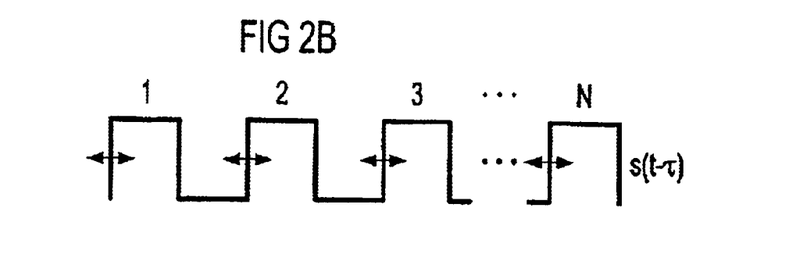

In the example according to FIGS. 2A and 2B, encoding is not yet involved. The double arrows in FIG. 2b (phase of the pulses is displaced as a function of code) illustrates the effects of later phase encoding.

The illustrated transmission signals s(t) and reception signals s(t–$\tau$) are envelopes of radio-frequency oscillations which have carrier properties. The actual carrier oscillation is however not included in the evaluation itself but rather only the envelope. For this reason, the carrier oscillations are not illustrated in this figure or in following figures.

Figure 3:
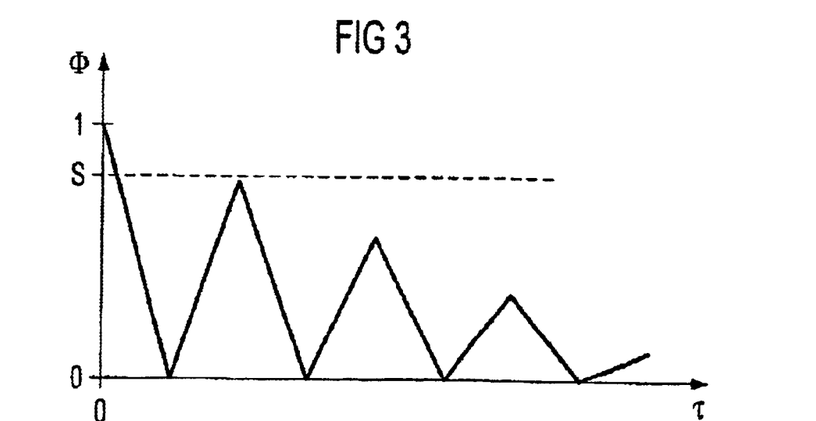
FIG. 3 shows a correlation signal of the two signals according to FIGS. 2A and 2B.

It will also be assumed that the code pulse (transmission signal s(t)) is composed of N individual pulses and is periodic. The two signals, specifically the transmission signal s(t) and the reception signal s(t–$\tau$) are then compared with one another in the base station 2. This is carried out using the known autocorrelation function $\Phi$ whose values are calculated by means of the two signals. The calculated AKF function $\Phi$ is illustrated in FIG. 3, which is obtained by multiplying and integrating the two transmission and reception signals of FIGS. 2A and 2B. The AKF function $\Phi$ assumes the maximum value, specifically 1, at the distance 0 (i.e. the code transmitter 6 is arranged directly at the antenna 3 of the base station 2). With increasing distance (corresponding to the signal transit time $\tau$) from the base station 2, the values of the AKF function $\Phi$ decrease. The AKF function $\Phi$ then varies periodically with the local maximum and minimum values. However, the local maximum values never reach the value 1 again but are rather considerably less than 1 and progressively decrease as the transit time increases. By appropriately dimensioning system parameters, it is possible to ensure that a predefined threshold value S is no longer exceeded by a local maximum value even after the main maximum value of the signal transit time $\tau$=0.

The AKF function Φ illustrated in FIG. 3 was calculated using the theoretical signals s(t) and s(t–τ), the two signals differing from one another merely in a signal transit time. If a code-dependent phase modulation is then impressed on the response signal which is emitted by the code transmitter 6, the maximum values of the correlation calculation (AKF function Φ) is then at a maximum if the modulation for both signals is the same.

Otherwise, the values of the AKF function are always smaller. The term used is then cross-correlation KKF although both are based on the same mathematical basic principle. Thus, encoding which is used in the code transmitter 6 and which differs from the encoding in the base station 2 can be recognized as different solely by means of the AKF/KKF function. It is already apparent from this that it is possible to evaluate the encoding using the correlation function.

By means of appropriate dimensioning it is possible to ensure that even with the smallest distance and with different encoding—using the AKF function and a correspondingly predefined threshold value S—it is possible to arrive at a reliable decision as to whether or not there is authorization, i.e. whether or not it is permitted to enable access to the vehicle or to use the vehicle.

If an authorized person emits any signal and in doing so does not know the correct code, he can never trigger an enable signal and confirm his authorization as the values of the AKF function are smaller with small transit times τ than the threshold value S. The correlation between the two signals is thus too small.

The following equation shows the calculated autocorrelation function AKF which can be calculate with the transmission signal s(t) and the reception signal s(t–τ):

$$\Phi(\tau) = \lim_{T \to \infty} \frac{1}{2T} \int_{-T}^{+T} s(t) \cdot s(t-\tau) dt$$

with the signal transit time τ=2 l/c+$t_0$, which is composed of the transit time 2l/c in free space (l=distance between object and code transmitter 6 and c=speed of light) and the transit time to which takes into account the transit time between the electronic modules, as well as the period duration T and the time t.

The AKF function Φ is obtained if the code transmitter 6 supplies the reception signal s(t–τ) which matches the reference signal. That is to say the autocorrelation function is applied if the signal is compared with itself (admittedly with a time delay). A KKF function Ψ (cross-correlation) is, on the other hand, generated automatically if the correct code is not specified at the code-transmitter end. The transmission signal s(t) is then emitted but a signal r(t–τ) which is different from it is received and these two signals are compared with one another in terms of their correlation. Apart from the signal transit time τ in such a case, pulse durations and/or the period duration of the signal r(t–τ) are different from those of the signal s(t).

With the AKF function and the KKF function, the reference signal and the received response signal are compared with one another. The term used is AKF function if the two signals differ only in the signal transit time. On the other hand, the term used is KKF function if the two signals also differ in their encoding. Generally, only the term correlation is used as it is only apparent in retrospect whether an AKF or KKF is present.

The formula for the cross-correlation function KKF is as follows:

$$\Psi(\tau) = \lim_{T \to \infty} \frac{1}{2T} \int_{-T}^{+T} s(t) \cdot r(t-\tau) dt$$

Even if the signal transit time τ in the KKF function Ψ were still to be in the permitted range (distance within a predefined range), given correct dimensioning only the difference between the two signals s(t) and r(t–τ) is already sufficient for the values of the KKF function to be below a predefined threshold value S. The values thus drop below the value of the correlation calculation which is necessary for the enabling of the vehicle.

Figure 4:
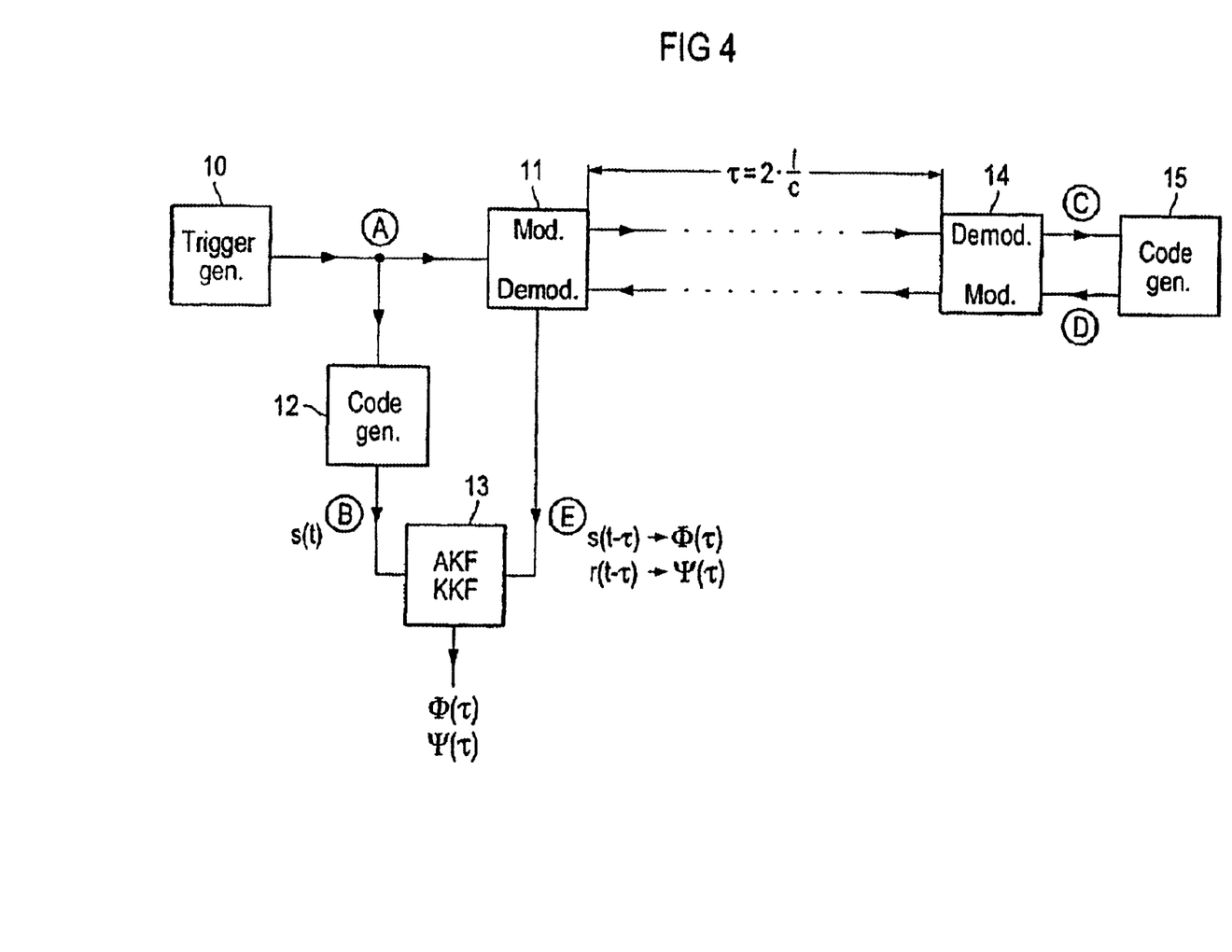
FIG. 4 shows a block circuit diagram of an identification system according to the invention.

FIG. 4 is a block circuit diagram of an identification system according to the invention. The base station 2 is arranged on the left-hand side, and the code transmitter 6 is arranged on the right-hand side of FIG. 4. The base station 2 has a trigger generator 10, a modulator/demodulator, a code generator 12 and a correlation unit 13. The code transmitter 6 itself has a demodulator/modulator 14 and a code generator 15.

Figures 5A, 5B, 5C:
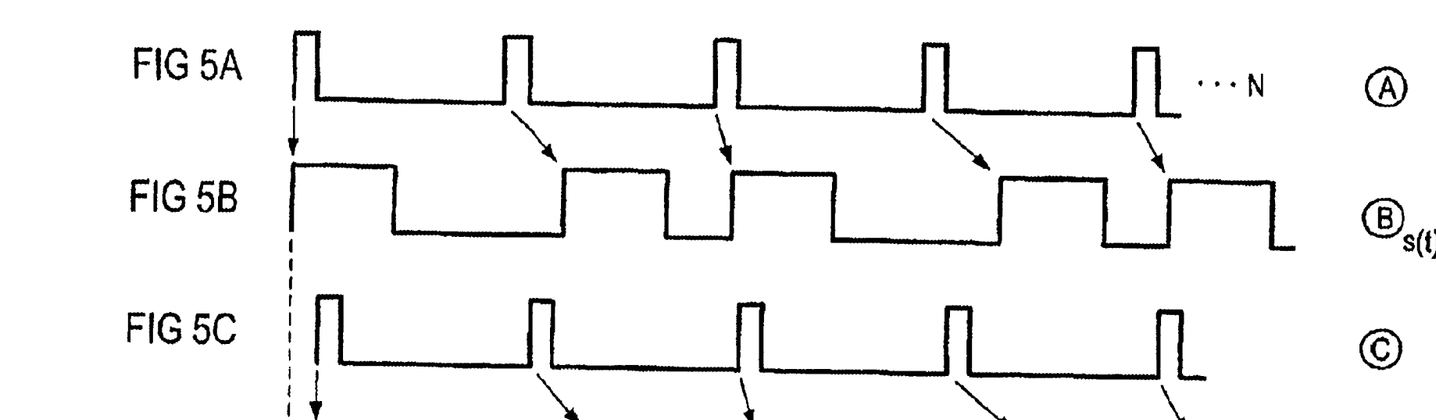

When the trigger generator 10 is triggered, for example by means of manual activation of the door handle or of a switch which is not illustrated, it generates a trigger signal A which is illustrated in the FIG. 5A. The time of the first rising edge of the trigger signal A is the reference point for the determination of the signal transit time τ.

This trigger signal A is, on the one hand, emitted via an antenna 3 in modulated form and, on the other hand, fed to the code generator 12 in order to generate an encoded reference signal B (FIG. 5B). The code transmitter 6 receives the trigger signal after the signal transit time τ/2 (signal C in FIG. 5C). The code generator 15 in the code transmitter 6 generates an encoded response signal D (FIG. 5D) from the trigger signal C according to the same code as the code generator 12 of the base station 2. The response signal D is transmitted back to the base station 2 and is then received as a response signal E (FIG. 5E) after the signal transit time τ.

Figures 5D, 5E:
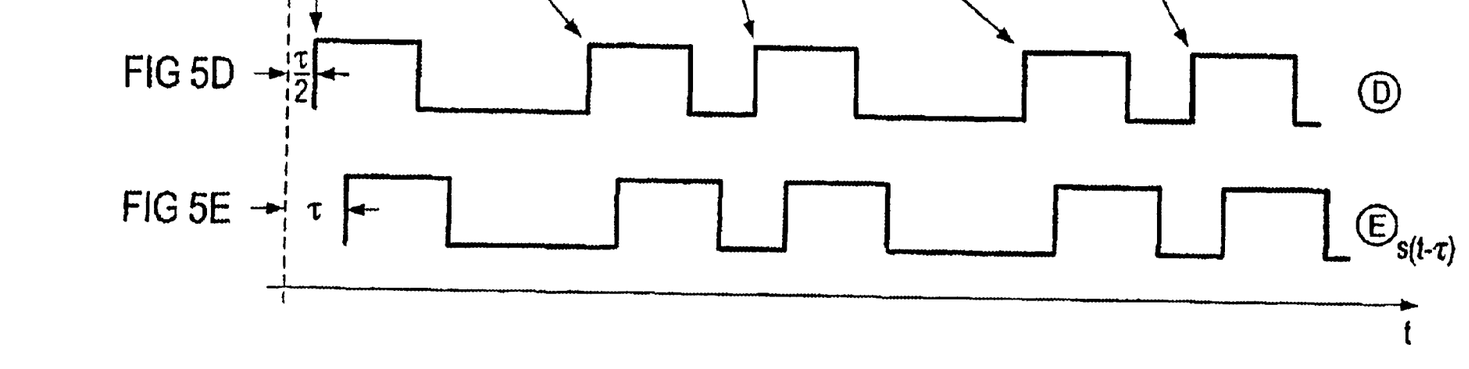

The response signal E (as signal s(t–τ)) and the reference signal B (as signal s(t)) are then compared with one another, i.e. subjected to a correlation calculation in a correlation or evaluation unit. The correlation function or the correlation between the two signals is then calculated. As both the distance between the code transmitter and the base station and the encoding influence the result of the calculation, both preconditions must be fulfilled in order to confirm authorization.

If the authorized code transmitter 6 is used, the AKF function is produced automatically in the correlation calculation as the two code generators generate identical structures of the signals B and E within the one cycle. The two signals differ only in the signal transit time τ. Correspondingly, the value Φ(τ) of the AKF function we received a value near to 1 when the signal transit time τ is small if the code transmitter 6 is within a range of only a few meters around the base station 2.

So that the signal transit time τ of the signals is not falsified by encoding, phase encoding is used for the encoding. In the present example, pulse encoding is used by means of which the rising edges of the signals B and D are phase-shifted (indicated by the arrows in FIGS. 5A–5D) as a function of the trigger signal A.

During the phase encoding, the amplitude and pulse durations of the signals are maintained. It is also possible to use pulse duration coding or modulation if rising and falling signal edge are phase modulated (in this case the pulse duration modulation is a special form of the pulse phase modulation).

Figure 6A:
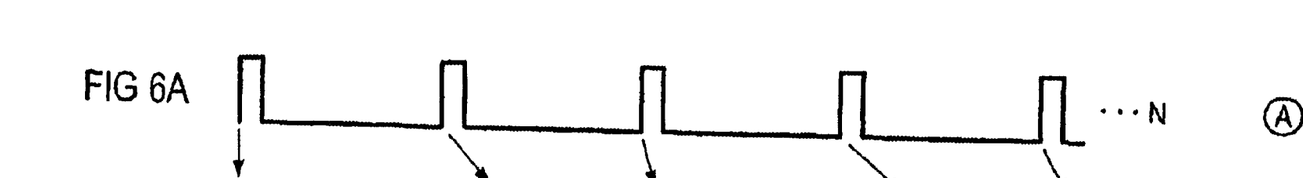
Figure 6B:
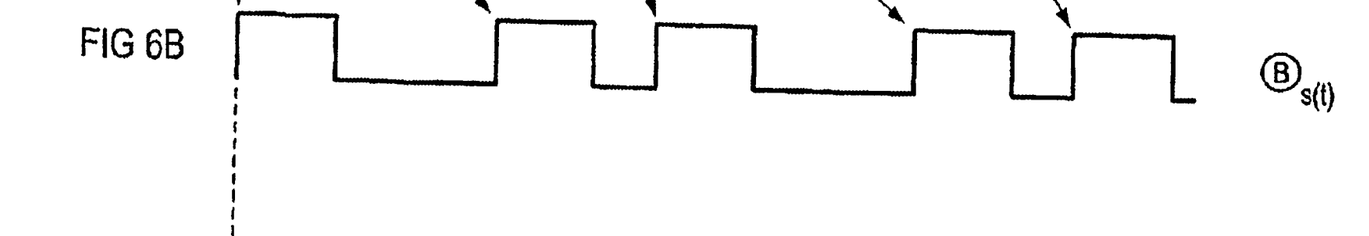
Figure 6C:
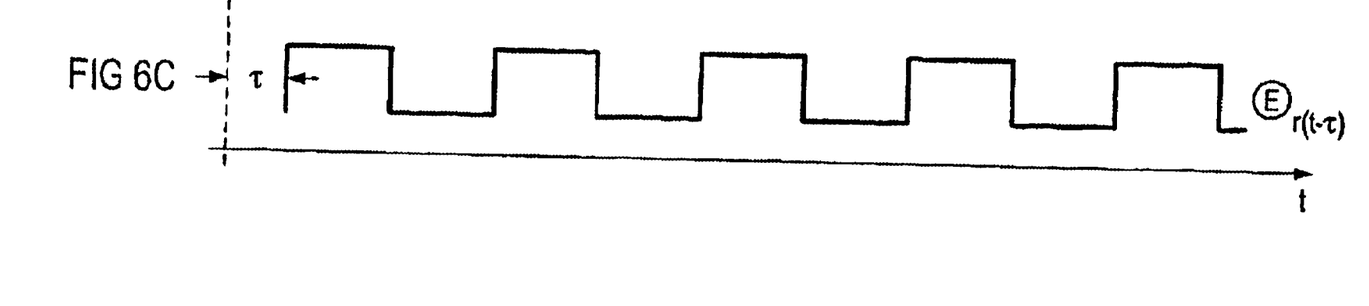

If a different code transmitter 6 were to be used having a code generator with a code that is different than that of the base station 2, the user with his code transmitter 6 could be in the vicinity of the motor vehicle 1 but his response signal would not be sufficient to confirm authorization, as FIGS. 6A to 6C are intended to clarify.

Although the emitted trigger signal A (FIG. 6A) can be received and used by the code transmitter 6, if a response signal E (FIG. 6C) is generated which does not use any phase modulation or uses different phase encoding to that in the base station 2, the correspondence between the response signal E and the reference signal B (FIG. 6B) would only be very small, i.e. the values of the cross-correlation function would be significantly smaller with the sensed signal transit time than with the auto-correlation function. An enable signal would not then be generated as the value of the cross-correlation function would not be above the predefined threshold value S.

Figure 7:
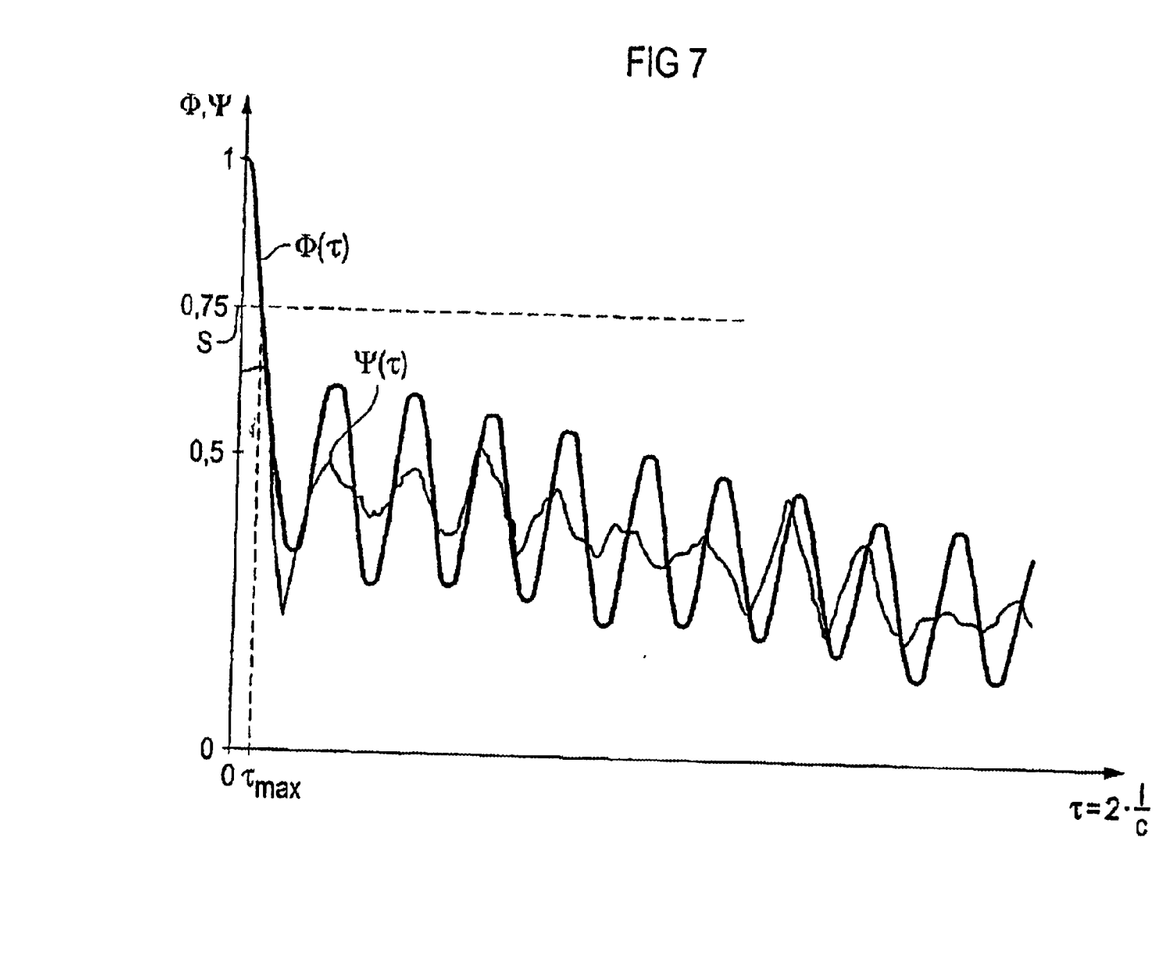
FIG. 7 shows correlation functions.

FIG. 7 illustrates the correlation functions as a function of the signal transit time $\tau$ for a specific exemplary embodiment with corresponding dimensioning of the system parameters. The functions according to FIG. 7 are values which are calculated from actually emitted and received signals. In the AKF function $\Phi(\tau)$, an authorized code transmitter 6 was used, while in the KKF function $\psi(\tau)$ an unauthorized code transmitter 6 was used whose encoding did not correspond to the authorized encoding.

In this exemplary embodiment, the degree or index of the phase modulation m=0.7 and a pulse number N=20 was used both at the authorized code transmitter and at the unauthorized code transmitter. As is apparent, the values for the KKF function is always somewhat less than 0.65 irrespective of the distance or the signal transit time $\tau$. If a threshold value S of approximately 0.7 to 0.85 were therefore to be used for the correlation function, an enable signal would be generated only if the value of the correlation function were greater than this threshold value S.

This is the case, on the one hand, if the encoding is used identically both in the base station 2 and at the code transmitter 6, and in addition the distance 1 between the code transmitter and the base station is smaller than a predefined maximum permitted distance $1_{max}$. This distance $1_{max}$ is usually defined in such a way that at this distance $1_{max}$ the value of the KKF function is reliably always less than the threshold value S, and the value of the AKF function between 0 and $1_{max}$ (i.e. between 0 and the maximum permitted signal transit time $\tau_{max}$) is always reliably greater. The distance $1_{max}$ should be only a few meters. This ensures that the authorized code transmitter 6 always has to be in the vicinity of the motor vehicle 1 in order to confirm its authorization. The authorized person then has his motor vehicle in sight. Misuse is then largely ruled out. Even if the response signal is illegitimately monitored and reproduced from a distance greater than $1_{max}$ in a way which is unnoticed by the user, this does not lead to confirmation of authorization.

The values of the correlation functions also depend on the transmission signal s(t) itself, specifically on the pulse number N. The number of pulses N can be set as a function of two criteria: the smaller the pulse number N, the faster the auto-correlation function decreases with the signal transit time $\tau$, and the greater the pulse number N the greater increase in the code security. A pulse number N with which the identification system is then operated can be set as a function of the code security and of the desired distance between the code transmitter and base station.

The identification system according to the invention is advantageously used in a motor vehicle (see FIG. 1) and also explained in more detail with respect to said motor vehicle by way of example. However, it can also be used with other objects, such as computers, telephones, the Internet, ATMs, toll roads, means of transportation (travel tickets), rooms, buildings and the like. The intention is that it will only be possible to confirm an authorization if, on the one hand, the correct code is used and the code transmitter 6 is also actually arranged in the vicinity of the object.

FIG. 1 specifies possible locations where the antennas 3 can be mounted when used in a motor vehicle 1. The antennas 3 are preferably located in the doors or in the roof of the trunk. They can also be arranged in the interior mirror, the exterior mirrors, fenders or at other exposed points in the motor vehicle 1.

The trigger signal A is not triggered and emitted until requested (for example by a switch or door handle on the motor vehicle 1 being actuated) once or repeatedly, or when a person approaches. If the code transmitter 6 receives the trigger signal, it generates the response signal which is encoded using the trigger signal, and transmits it back.

Only if the calculated value of the correlation function is above a predefined threshold value S (only then is the code transmitter 6 near enough to the motor vehicle 1 and also using the correct encoding), is the enable signal generated in order to enable the security assembly. Consequently, the enable signal can then trigger the unlocking of the doors or the releasing of the immobilizer 5. The enable signal can of course also be used to control other assemblies such as user-specific settings of the seats, mirrors and the like.

The mounting locations and the number of transmission and reception antennas 3 emerge from the geometry of the vehicle in order to satisfy the desired requirements in terms of sensing range (distance between code transmitter and base station) in which the code transmitter 6 is supposed to be, and in terms of the carrying convenience of the code transmitter 6.

The transceiver unit can physically be a single unit. It is also possible to use a transmitter unit and a receiver unit which is spatially separated from it. The evaluation of the response signal (calculation of the correlation function) can be carried out in the receiver unit or else in a separate evaluation unit.

The identification system according to the invention provides additional protection against monitoring and reproduction of the response signal if the encoding is changed in comparison with the preceding one at every transmission. Such changes in the encoding are known and are also referred to as alternating code or rolling code. As this is known, further details are not given.

In the identification system according to the invention there is advantageously no comparison between the digitized signals and demodulated signals but rather there is a comparison between the analog, time-dependent encoded signals. In this context it is not the code content of the signals which is of interest but rather only the value of correspondence, of the values calculated by means of the auto-correlation or cross-correlation, which values are dependent on analog, time-dependent signals. Only if the value which is calculated during the correlation is greater than a threshold value S is the authorization confirmed. The identification system therefore also requires no costly components for digital signal processing.

In the pulse phase modulation which is advantageously used, the phase angle of the individual pulses of a code pulse is changed by means of an item of information (trigger signal here). The amplitude of the code pulse and the pulse duration remain unchanged. The phase shift of the pulses can be expressed by means of a time deflection. The apex value of the time deflection corresponds to the phase travel. The modulation index or modulation degree during a pulse phase modulation is calculated from the apex value of the time deflection divided by half the pulse period duration.

The object-end transceiver unit or the evaluation unit and the code transmitter 6 can each have a memory in which in each case the reference signal and the code (mathematical algorithm or fixed code) are stored. The memory is configured in such a way that it cannot be read from the outside, or can only be read with authorization.

What is claimed is:

1. An identification system for confirming authorization for access to an object or the use of an object comprising:
   a transceiver unit which is arranged at the object and which generates and emits a trigger signal, wherein a phase-encoded reference signal is generated using the trigger signal and a defined code,
   a mobile code transmitter which receives the trigger signal and generates a phase-encoded response signal using the received trigger signal and a code which corresponds to the code of the transceiver unit, and transmits the response signal back, and
   an object-end evaluation unit which has a correlation unit which calculates a correlation value of a correlation function using the received response signal and the reference signal and which generates an enable signal for controlling a security assembly only if the correlation value is greater than a predefined threshold value.

2. The identification system as claimed in claim 1, wherein the transceiver unit and/or the evaluation unit each have a memory in which the reference signal and the code are stored.

3. The identification system as claimed in claim 1, wherein the response signal is transmitted in a phase-modulated fashion with a carrier frequency in the frequency range greater than 100 kHz.

4. The identification system as claimed in claim 1, wherein the evaluation unit predefines the threshold value with which the calculated value of the correlation is compared.

5. The identification system as claimed in claim 3, wherein the response signal is transmitted in a phase-modulated fashion with a carrier frequency of approximately 433 MHz.

6. The identification system as claimed in claim 3, wherein the response signal is transmitted in a phase-modulated fashion with a carrier frequency of approximately 868 MHz.

7. The identification system as claimed in claim 1, wherein the object is a motor vehicle.

8. A method for confirming authorization for access to an object or the use of an object comprising the steps of:
   generating and emitting a trigger signal at the object;
   generating a phase-encoded reference signal using the trigger signal and a defined code at the object,
   receiving the trigger signal at a mobile code transmitter;
   generating a phase-encoded response signal using the received trigger signal and a code which corresponds to the code of the transceiver unit;
   transmitting the response signal back to the object;
   calculating a correlation value of a correlation function using the received response signal and the reference signal; and
   generating an enable signal for controlling a security assembly only if the correlation value is greater than a predefined threshold value.

9. The method as in claim 8, further comprising the step of storing the reference signal and the code.

10. The method as in claim 8, wherein the response signal is transmitted in a phase-modulated fashion with a carrier frequency in the frequency range greater than 100 kHz.

11. The method as in claim 8, further comprising the step of predefining the threshold value with which the calculated value of the correlation is compared.

12. The method as in claim 10, wherein the response signal is transmitted in a phase-modulated fashion with a carrier frequency of approximately 433 MHz.

13. The method as in claim 10, wherein the response signal is transmitted in a phase-modulated fashion with a carrier frequency of approximately 868 MHz.

14. A motor vehicle having an identification system for confirming authorization for access to the motor vehicle comprising:
   a transceiver unit which is arranged at the motor vehicle and which generates and emits a trigger signal, wherein a phase-encoded reference signal is generated using the trigger signal and a defined code,
   a mobile code transmitter which receives the trigger signal and generates a phase-encoded response signal using the received trigger signal and a code which corresponds to the code of the transceiver unit, and transmits the response signal back, and
   an evaluation unit arranged in the motor vehicle which has a correlation unit which calculates a correlation value of a correlation function using the received response signal and the reference signal and which generates an enable signal for controlling a security assembly only if the correlation value is greater than a predefined threshold value.

15. The motor vehicle as claimed in claim 14, wherein the transceiver unit and/or the evaluation unit each have a memory in which the reference signal and the code are stored.

16. The motor vehicle as claimed in claim 14, wherein the response signal is transmitted in a phase-modulated fashion with a carrier frequency in the frequency range greater than 100 kHz.

17. The motor vehicle as claimed in claim 14, wherein the evaluation unit predefines the threshold value with which the calculated value of the correlation is compared.

18. The motor vehicle as claimed in claim 16, wherein the response signal is transmitted in a phase-modulated fashion with a carrier frequency of approximately 433 MHz.

19. The motor vehicle as claimed in claim 16, wherein the response signal is transmitted in a phase-modulated fashion with a carrier frequency of approximately 868 MHz.

* * * * *